US012617456B2

(12) United States Patent
Miyake et al.

(10) Patent No.: US 12,617,456 B2
(45) Date of Patent: May 5, 2026

(54) STEERING CONTROL DEVICE

(71) Applicants:JTEKT CORPORATION, Kariya (JP);
**TOYOTA JIDOSHA KABUSHIKI
KAISHA**, Toyota (JP)

(72) Inventors: Junya Miyake, Okazaki (JP); **Toru
Takashima, Susono (JP); Hidetsugu
Toyama**, Susono (JP)

(73) Assignees: JTEKT CORPORATION, Kariya (JP);
**TOYOTA JIDOSHA KABUSHIKI
KAISHA**, Toyota (JP)

( * ) Notice: Subject to any disclaimer, the term of this
patent is extended or adjusted under 35
U.S.C. 154(b) by 59 days.

(21) Appl. No.: 18/921,476

(22) Filed: Oct. 21, 2024

(65) Prior Publication Data

US 2025/0136176 A1 May 1, 2025

(30) Foreign Application Priority Data

Oct. 27, 2023 (JP) ................................. 2023-184775

(51) Int. Cl.
B62D 6/00 (2006.01)
B62D 5/04 (2006.01)
(52) U.S. Cl.
CPC ............. B62D 6/002 (2013.01); B62D 5/046
(2013.01)
(58) Field of Classification Search
CPC ....... B62D 5/046; B62D 5/0463; B62D 6/002
See application file for complete search history.

(56) References Cited

U.S. PATENT DOCUMENTS

2020/0164916 A1 5/2020 Shibata et al.
2022/0089218 A1 3/2022 Kodera et al.

FOREIGN PATENT DOCUMENTS

JP 4466066 B2 * 5/2010
JP 2020-083059 A 6/2020

OTHER PUBLICATIONS

Kasahara ,JP 4466066, machine translation. (Year: 2010).*
Mar. 18, 2025 Extended Search Report issued in European Patent
Application No. 24208360.8.

* cited by examiner

*Primary Examiner* — Mark L. Greene
(74) *Attorney, Agent, or Firm* — OLIFF PLC

(57) ABSTRACT

A steering control device includes: a target rotation angle
calculation circuit that calculates a target rotation angle of a
shaft; an offset angle calculation circuit that calculates an
offset angle relative to the target rotation angle; a final target
rotation angle calculation circuit that calculates a final target
rotation angle of the shaft; and a feedback control circuit that
executes feedback control that adapts a real angle to the final
target rotation angle. The offset angle calculation circuit
calculates an estimated rotation angle deviation based on a
value of a current of a turning motor immediately before a
specific event occurs, and calculates the offset angle by
subtracting the real angle and the estimated rotation angle
deviation from the target rotation angle.

7 Claims, 4 Drawing Sheets

STEERING CONTROL DEVICE

CROSS-REFERENCE TO RELATED APPLICATION

This application claims priority to Japanese Patent Application No. 2023-184775 filed on Oct. 27, 2023. The disclosure of the above-identified application, including the specification, drawings, and claims, is incorporated by reference herein in its entirety.

BACKGROUND

1. Technical Field

The present disclosure relates to a steering control device.

2. Description of Related Art

There is a so-called steer-by-wire steering device in which power transmission between a steering wheel and turning wheels is cut off. The steering device includes a reaction force motor that is a generation source of a steering reaction force to be applied to a steering shaft, and a turning motor that is a generation source of a turning force for turning the turning wheels. A control device of the steering device generates the steering reaction force through control of electric power supply to the reaction force motor, and turns the turning wheels through control of electric power supply to the turning motor.

For example, the control device of Japanese Unexamined Patent Application Publication No. 2020-83059 (JP 2020-83059 A) executes an output restriction process that restricts an output of a turning motor when an output restriction condition is met. Examples of the output restriction condition include that a temperature of the turning motor exceeds a temperature threshold value, and that a voltage supplied to the turning motor falls below a voltage threshold value. Through the execution of the output restriction process, a temperature rise of the turning motor or power consumption of the turning motor is restricted.

SUMMARY

In conventional control devices having the function of restricting the output of the turning motor, including the control device of JP 2020-83059 A, there is a concern as follows: When the restriction on the output of the turning motor is canceled as the output restriction condition fails to be met or a specified output restriction cancelation condition is met, the output of the turning motor may change rapidly. A rapid change in the output of the turning motor constitutes a factor in causing abnormal sound or vibration.

One aspect of the present disclosure is a steering control device. The steering control device is configured to control electric power supply to a turning motor that drives a steering device that turns a turning wheel of a vehicle. The steering control device includes: a target rotation angle calculation circuit or unit configured to calculate, according to a steering angle of a steering wheel, a target rotation angle of a shaft that rotates in conjunction with a turning action of the turning wheel; an offset angle calculation circuit or unit configured to calculate an offset angle relative to the target rotation angle when a specific event occurs in a state where there is a discrepancy between the target rotation angle and a real angle of the shaft; a final target rotation angle calculation circuit or unit configured to calculate a final target rotation angle of the shaft by subtracting the offset angle from the target rotation angle; and a feedback control circuit or unit configured to execute feedback control that adapts the real angle to the final target rotation angle. The offset angle calculation circuit or unit is configured to calculate an estimated rotation angle deviation based on a value of a current of the turning motor immediately before the specific event occurs, and is configured to calculate the offset angle by subtracting the real angle and the estimated rotation angle deviation from the target rotation angle.

According to this configuration, when the specific event occurs, the final target rotation angle does not match the present value of the real angle of the shaft. Therefore, while the absolute value of the current supplied to the turning motor decreases rapidly, the absolute value of the current supplied to the turning motor does not instantly reach "0." Thus, a rapid change in the output of the turning motor and, by extension, a rapid change in the turning angle of the turning wheel due to the absolute value of the current supplied to the turning motor instantly reaching "0" can be made less likely.

In the above-described steering control device, the offset angle calculation circuit may be configured to gradually reduce the offset angle toward zero after calculating the offset angle. According to this configuration, the real angle of the shaft can be adapted to the final target rotation angle while a rapid change in the output of the turning motor is made less likely.

In the above-described steering control device, the feedback control circuit may be configured to execute proportional control that controls the real angle in proportion to a deviation of the real angle from the final target rotation angle. When the estimated rotation angle deviation is "$\Delta\theta_p^\wedge$" the value of the current of the turning motor immediately before the specific event occurs is "$I_b$," a proportional gain of the feedback control unit is "$G_p$," a rated current of the turning motor is "$I_r$," and a rated pinion torque is "$T_p$," the offset angle calculation circuit may be configured to calculate the estimated rotation angle deviation based on the following Formula (A):

$$\Delta\theta_p^\wedge = I_b / \{ G_p \cdot I_r / T_p \} \tag{A}$$

According to this configuration, the estimated rotation angle deviation of the shaft can be calculated as an angle corresponding to correction by the proportional control from the last time to the present time.

In the above-described steering control device, the specific event may be that execution of a current restriction process in which a current supplied to the turning motor is restricted is ended. When the current restriction process for the turning motor is executed as in this configuration, a discrepancy occurs between the target rotation angle and the real angle. According to this configuration, a rapid change in the output of the turning motor can be made less likely when the execution of the current restriction process is ended.

In the above-described steering control device, the specific event may be that a power source of the vehicle is turned on. According to this configuration, a rapid change in the output of the turning motor can be made less likely in the case where there is a discrepancy between the target rotation angle and the real angle when the vehicle power source is turned on.

In the above-described steering control device, the steering device may be a steer-by-wire steering device in which power transmission between the steering wheel and the turning wheel is cut off. This steering control device is suitable for a steer-by-wire steering device.

In the above-described steering control device, the steering device may be an electric power steering device in which the steering wheel and the turning wheel are coupled to each other so as to transmit power. The electric power steering device may have a variable-gear-ratio function of changing a steering gear ratio that is a ratio of a turning angle of the turning wheel to the steering angle of the steering wheel.

This steering control device is suitable for an electric power steering device having a variable-gear-ratio function.

The steering control device of the present disclosure can make a rapid change in the output of the turning motor less likely.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment of a steering control device will be described below.

Overall Configuration

Figure 1:
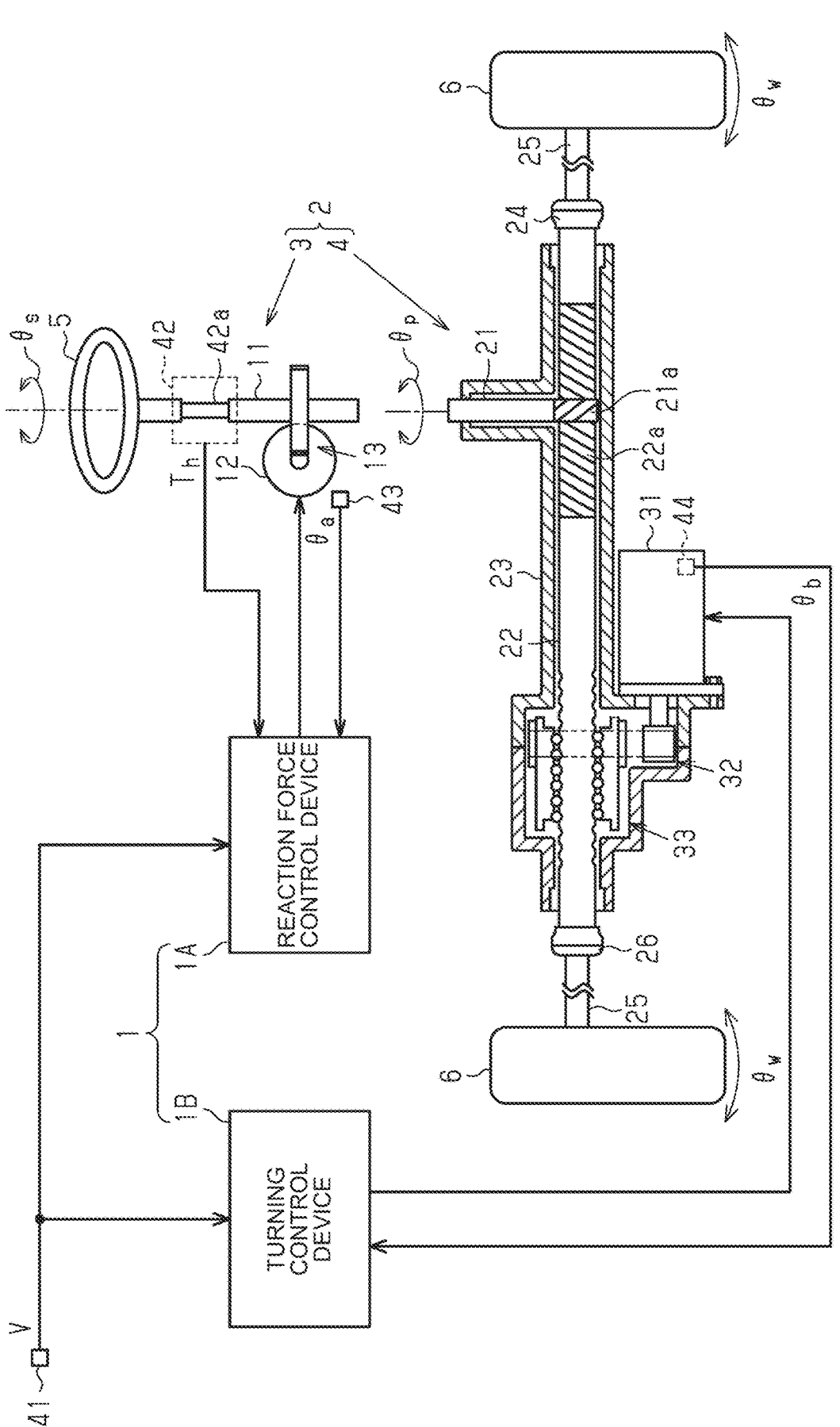
FIG. 1 is a configuration diagram of a steering device equipped with one embodiment of a steering control device.

As shown in FIG. 1, a control target of a steering control device 1 is a steer-by-wire steering device 2. The steering device 2 has a steering mechanism 3 and a turning mechanism 4. The steering mechanism 3 is a mechanical part that is steered by a driver through a steering wheel 5. The turning mechanism 4 is a mechanical part that turns turning wheels 6 of a vehicle according to steering of the steering wheel 5. The steering control device 1 includes a reaction force control device 1A and a turning control device 1B. A control target of the reaction force control device 1A is the steering mechanism 3. The reaction force control device 1A executes reaction force control. A control target of the turning control device 1B is the turning mechanism 4. The turning control device 1B executes turning control.

The steering mechanism 3 has a steering shaft 11, a reaction force motor 12, and a speed reducer 13. The steering wheel 5 is coupled to the steering shaft 11 so as to be integrally rotatable. The reaction force motor 12 is a generation source of a steering reaction force to be applied to the steering shaft 11. The steering reaction force is a force in the opposite direction from a steering direction of the steering wheel 5. The reaction force motor 12 is, for example, a three-phase brushless motor. The speed reducer 13 decelerates rotation of the reaction force motor 12 and transmits the decelerated rotation to the steering shaft 11.

The turning mechanism 4 has a pinion shaft 21, a turning shaft 22, and a housing 23. The housing 23 rotatably supports the pinion shaft 21. The housing 23 reciprocably houses the turning shaft 22. Power transmission between the turning shaft 22 and the steering wheel 5 is cut off. The pinion shaft 21 is provided so as to intersect with the turning shaft 22. Pinion teeth 21a of the pinion shaft 21 mesh with rack teeth 22a of the turning shaft 22. At both ends of the turning shaft 22, tie rods 25 are coupled through rack ends 24 formed by ball joints. Leading ends of the tie rods 25 are coupled to knuckles (not shown) on which the turning wheels 6 are mounted.

The turning mechanism 4 includes a turning motor 31, a transmission mechanism 32, and a conversion mechanism 33. The turning motor 31 is a generation source of a turning force to be applied to the turning shaft 22. The turning force is a force for turning the turning wheels 6. The turning motor 31 is, for example, a three-phase brushless motor. The transmission mechanism 32 is, for example, a belt transmission mechanism. The transmission mechanism 32 transmits rotation of the turning motor 31 to the conversion mechanism 33. The conversion mechanism 33 is, for example, a ball screw mechanism. The conversion mechanism 33 converts the rotation transmitted through the transmission mechanism 32 into movement of the turning shaft 22 in an axial direction.

As the turning shaft 22 moves in the axial direction, a turning angle $\theta_w$ of the turning wheels 6 is changed. Since the pinion teeth 21a of the pinion shaft 21 are meshed with the rack teeth 22a of the turning shaft 22, the pinion shaft 21 rotates in conjunction with the movement of the turning shaft 22. The pinion shaft 21 is a shaft or a rotating body that rotates in conjunction with a turning action of the turning wheels 6.

The reaction force control device 1A controls the operation of the reaction force motor 12. The reaction force control device 1A has a processing circuit including one of the following three Configurations A1, A2, and A3:

A1. One or more processors that operate according to a computer program that is software.

Each processor includes a central processing unit (CPU) and a memory.

A2. One or more dedicated hardware circuits, such as application-specific integrated circuits (ASICs), that execute at least some of various processes.

Each ASIC includes a CPU and a memory.

A3. A hardware circuit combining Configurations A1 and A2.

The memory is a medium that is readable by a computer, and stores programs describing processes or commands for the computer. In this embodiment, the computer is a CPU.

The memory includes a random-access memory (RAM) and a read-only memory (ROM). The CPU executes various modes of control by executing programs stored in the memory on a specified calculation cycle.

The reaction force control device 1A takes in detection results of on-board sensors. These sensors include a vehicle speed sensor 41, a torque sensor 42, and a rotation angle sensor 43. The vehicle speed sensor 41 detects a vehicle speed V. The vehicle speed V is a state variable reflecting a travel state of the vehicle. The torque sensor 42 is provided on the steering shaft 11. The torque sensor 42 is located on the side of the steering wheel 5 relative to a part of the steering shaft 11 at which the speed reducer 13 is coupled. The torque sensor 42 detects a steering torque Th applied to the steering shaft 11. The steering torque Th is calculated based on an amount of twisting of a torsion bar 42a that is provided in the steering shaft 11. The rotation angle sensor 43 is provided on the reaction force motor 12. The rotation angle sensor 43 detects a rotation angle $\theta_a$ of the reaction force motor 12.

The reaction force control device 1A controls the operation of the reaction force motor 12 using the detection results of the vehicle speed sensor 41, the torque sensor 42, and the rotation angle sensor 43. The reaction force control device 1A controls electric power supply to the reaction force motor 12 so as to make the reaction force motor 12 generate a steering reaction force according to the steering torque Th. The reaction force control device 1A is a processing device that controls the driving of the reaction force motor 12 according to a steering state of the steering wheel 5.

The turning control device 1B controls the operation of the turning motor 31. As with the reaction force control device 1A, the turning control device 1B has a processing circuit including one of the three Configurations A1, A2, and A3 described earlier. The turning control device 1B takes in detection results of on-board sensors. These sensors include a rotation angle sensor 44. The rotation angle sensor 44 is provided on the turning motor 31. The rotation angle sensor 44 detects a rotation angle $\theta_b$ of the turning motor 31.

The turning control device 1B controls the operation of the turning motor 31 using the detection result of the rotation angle sensor 44. The turning control device 1B controls electric power supply to the turning motor 31 such that the turning wheels 6 are turned according to the steering state of the steering wheel 5. The turning control device 1B is a processing device that controls the driving of the turning motor 31 according to the steering state of the steering wheel 5.

The turning control device 1B determines whether the turning wheel 6 is in contact with an obstacle. One example of obstacles is a curbstone. The turning control device 1B determines that the turning wheel is in contact with an obstacle when specified determination conditions are met. Examples of the determination conditions include that a state where a value of an actual current supplied to the turning motor is equal to or larger than a current threshold value continues for a predetermined time. When it is determined that the turning wheel 6 is in contact with an obstacle, the turning control device 1B executes specified control to make overheating of the turning motor 31 less likely. The specified control includes a current restriction process that restricts the current supplied to the turning motor 31. The current restriction process is one example of an under-high-load process that is executed when a high load acts on the turning motor 31.

Configuration of Reaction Force Control Device 1A

Figure 2:
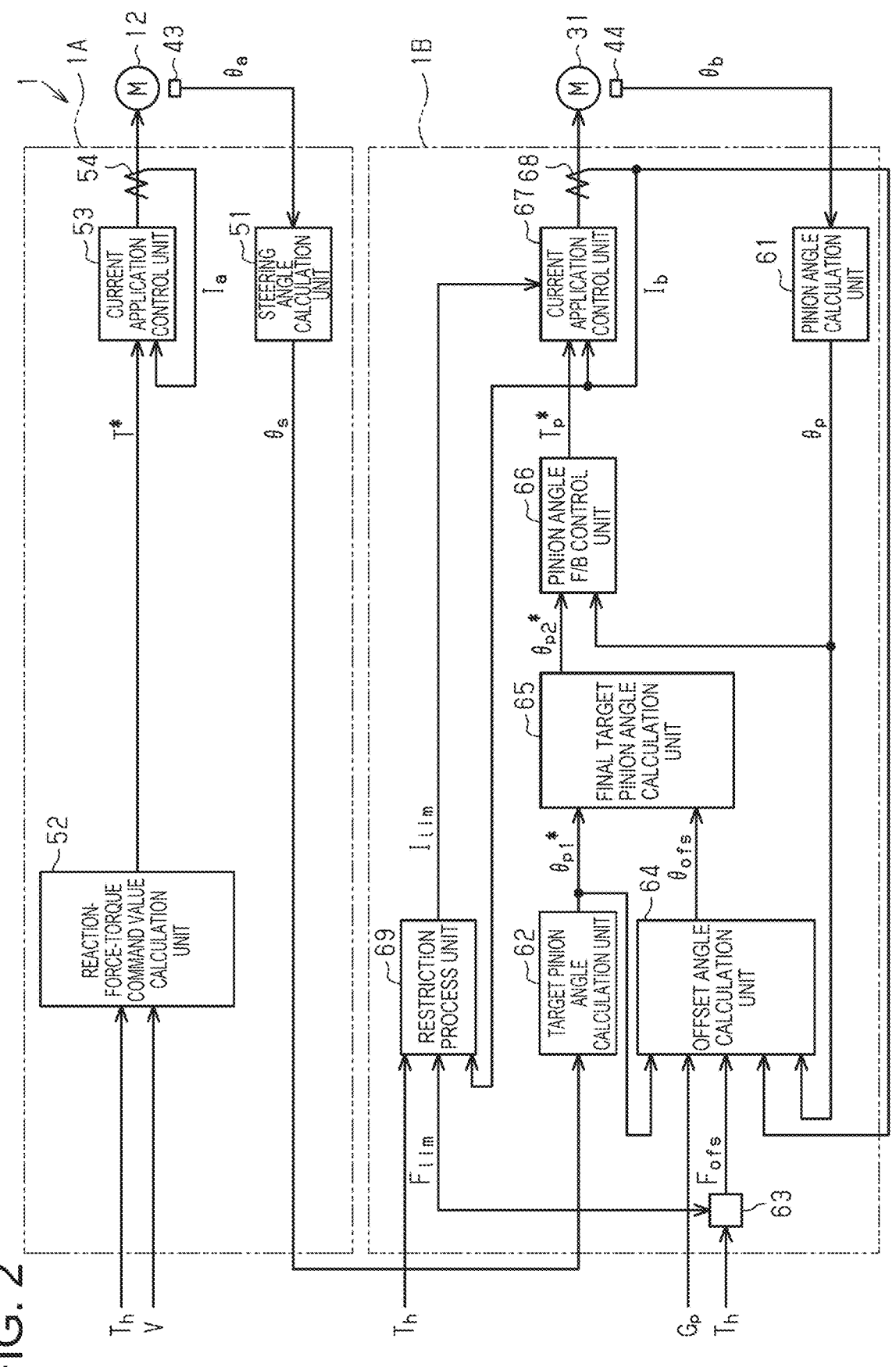
FIG. 2 is a block diagram of a reaction force control device and a turning control device according to one embodiment.

Next, the configuration of the reaction force control device 1A will be described. As shown in FIG. 2, the reaction force control device 1A has a steering angle calculation unit 51, a reaction-force-torque command value calculation unit 52, a current application control unit 53, and a current sensor 54.

The steering angle calculation unit 51 calculates a steering angle $\theta_s$ of the steering wheel 5 based on the rotation angle $\theta_a$ of the reaction force motor 12 detected through the rotation angle sensor 43. The reaction-force-torque command value calculation unit 52 calculates a reaction-force-torque command value T* based on the steering torque Th and the vehicle speed V. The reaction-force-torque command value T* is a target value of the steering reaction force that should be generated by the reaction force motor 12. The steering reaction force is a torque in the opposite direction from the steering direction of the steering wheel 5. The absolute value of the reaction-force-torque command value T* becomes larger as the absolute value of the steering torque Th becomes larger and as the vehicle speed V becomes lower.

The current application control unit 53 supplies electric power according to the reaction-force-torque command value T* to the reaction force motor 12. Specifically, the current application control unit 53 calculates a current command value for the reaction force motor 12 based on the reaction-force-torque command value T*. The current application control unit 53 detects a value of a current $I_a$ that occurs in an electric power supply path to the reaction force motor 12 through the current sensor 54 provided in the electric power supply path. The value of the current $I_a$ is a value of the current supplied to the reaction force motor 12. The current application control unit 53 obtains a deviation of the value of the current $I_a$ from the current command value and controls the electric power supply to the reaction force motor 12 so as to eliminate this deviation. Specifically, the current application control unit 53 executes feedback control of the current $I_a$ such that the value of the current $I_a$ adapts to the current command value. The feedback control is, for example, PID control. The PID control includes proportional control (P-control), integral control (I-control), and derivative control (D-control). Feedback gains that are control parameters of the feedback control include a proportional gain, an integral gain, and a derivative gain. Through the feedback control of the current $I_a$, the reaction force motor 12 generates a torque according to the reaction-force-torque command value T*.

Configuration of Turning Control Device 1B

Next, the configuration of the turning control device 1B will be described. As shown in FIG. 2, the turning control device 1B has a pinion angle calculation unit 61, a target pinion angle calculation unit 62, an offset determination unit 63, an offset angle calculation unit 64, a final target pinion angle calculation unit 65, a pinion angle feedback control unit 66, a current application control unit 67, a current sensor 68, and a restriction process unit 69.

The pinion angle calculation unit 61 calculates a pinion angle $\theta_p$ based on the rotation angle $\theta_b$ of the turning motor 31 detected through the rotation angle sensor 43. The pinion angle $\theta_p$ is a rotation angle of the pinion shaft 21 and corresponds to a real angle of the pinion shaft 21 that is an actual angle thereof. The turning motor 31 and the pinion shaft 21 operate in conjunction with each other through the transmission mechanism 32, the conversion mechanism 33, and the turning shaft 22. Thus, there is a correlation between the rotation angle $\theta_b$ of the turning motor 31 and the pinion angle $\theta_p$. Using this correlation, the pinion angle $\theta_p$ can be obtained from the rotation angle $\theta_b$ of the turning motor 31. The pinion shaft 21 is meshed with the turning shaft 22. Thus, there is also a correlation between the pinion angle $\theta_p$ and an amount of movement of the turning shaft 22. Therefore, the pinion angle $\theta_p$ is a value reflecting the turning angle $\theta_w$ of the turning wheels 6.

The target pinion angle calculation unit 62 calculates a target pinion angle $\theta_{p1}*$ based on the steering angle $\theta_s$ calculated by the steering angle calculation unit 51. The target pinion angle $\theta_{p1}*$ is a target rotation angle of the pinion angle $\theta_p$. The target pinion angle calculation unit 62 calculates the target pinion angle $\theta_{p1}*$ such that a steered angle ratio that is set according to the product specifications etc. is realized. The steered angle ratio is a ratio of the turning angle $\theta_w$ to the steering angle $\theta_s$.

The target pinion angle calculation unit 62 sets the steered angle ratio according to, for example, a travel state of the vehicle, such as the vehicle speed V, and calculates the target pinion angle $\theta_{p1}*$ according to this set steered angle ratio. The target pinion angle calculation unit 62 calculates the target pinion angle $\theta_{p1}*$such that the turning angle $\theta_w$ relative to the steering angle $\theta_s$ becomes larger as the vehicle speed V becomes lower. The target pinion angle calculation unit 62 calculates the target pinion angle $\theta_{p1}*$ such that the turning angle $\theta_w$ relative to the steering angle $\theta_s$ becomes smaller as the vehicle speed V becomes higher. To realize the steered angle ratio that is set according to the travel state of the vehicle, the target pinion angle calculation unit 62 calculates the target pinion angle $\theta_{p1}*$ according to the steered angle ratio by calculating a correction angle relative to the steering angle $\theta_s$ and adding the calculated correction angle to the steering angle $\theta_s$.

Depending on the product specifications etc., the target pinion angle calculation unit 62 may calculate the target pinion angle $\theta_{p1}*$ such that the steered angle ratio becomes "1:1" regardless of the travel state of the vehicle.

The offset determination unit 63 takes in the steering torque Th that is detected through the torque sensor 42 and a value of a current restriction flag $F_{lim}$ that is set by the restriction process unit 69 to be described later. Based on the steering torque Th and the value of the current restriction flag $F_{lim}$, the offset determination unit 63 determines whether the situation is such that the target pinion angle $\theta_{p1}*$ should be offset.

The offset determination unit 63 determines that the situation is such that the target pinion angle $\theta_{p1}*$ should be offset, when steering back is performed in a situation where the turning wheel 6 is hitting an obstacle, i.e., a situation where the current restriction process for the turning motor 31 is being executed. Based on the value of the current restriction flag $F_{lim}$, the offset determination unit 63 determines whether the current restriction process for the turning motor 31 is being executed. The offset determination unit 63 determines whether steering back has been performed through a comparison between the steering torque Th that is detected through the torque sensor 42 and a steering torque threshold value. The steering torque threshold value is stored in the memory. When the situation is such that the target pinion angle $\theta_{p1}*$ should be offset, the offset determination unit 63 sets the value of an offset determination flag $F_{ofs}$ to "on."

When the turning wheel 6 is not hitting an obstacle, i.e., when the current restriction process for the turning motor 31 is not being executed, the offset determination unit 63 determines that the situation is not such that the target pinion angle $\theta_{p1}*$ should be offset. When the situation is not such that the target pinion angle $\theta_{p1}*$ should be offset, the offset determination unit 63 sets the value of the offset determination flag $F_{ofs}$ to "off."

The offset angle calculation unit 64 takes in the pinion angle $\theta_p$ calculated by the pinion angle calculation unit 61, the target pinion angle $\theta_{p1}*$ calculated by the target pinion angle calculation unit 62, and the value of the offset determination flag $F_{ofs}$ set by the offset determination unit 63. The offset angle calculation unit 64 calculates an offset angle $\theta_{ofs}$ when the value of the offset determination flag $F_{ofs}$ is "on." As shown in the following Formula (1), the offset angle $\theta_{ofs}$ is, for example, a difference between the target pinion angle $\theta_{p1}*$ and the pinion angle $\theta_p$.

$$\theta_{ofs} = \theta_{p1}* - \theta_p \tag{1}$$

After calculating the offset angle $\theta_{ofs}$, the offset angle calculation unit 64 gradually reduces the offset angle $\theta_{ofs}$ toward "0" as time passes.

When the value of the offset determination flag $F_{ofs}$ is "off," the offset angle calculation unit 64 does not calculate the offset angle $\theta_{ofs}$, or sets the value of the offset angle $\theta_{ofs}$ to "0."

The final target pinion angle calculation unit 65 takes in the target pinion angle $\theta_{p1}*$ calculated by the target pinion angle calculation unit 62 and the offset angle $\theta_{ofs}$ calculated by the offset angle calculation unit 64. The final target pinion angle calculation unit 65 calculates a final target pinion angle $\theta_{p2}*$ based on the target pinion angle $\theta_{p1}*$ and the offset angle $\theta_{ofs}$. As shown in the following Formula (2), the final target pinion angle $\theta_{p2}*$ is a difference between the target pinion angle $\theta_{p1}*$ and the offset angle $\theta_{ofs}$. The final target pinion angle $\theta_{p2}*$ corresponds to a final target rotation angle of the pinion shaft 21.

$$\theta_{p2}* = \theta_{p1}* - \theta_{ofs} \tag{2}$$

When the offset angle $\theta_{ofs}$ is not calculated by the offset angle calculation unit 64, or when the value of the offset angle $\theta_{ofs}$ is set to "0" by the offset angle calculation unit 64, the target pinion angle $\theta_{p1}*$ calculated by the target pinion angle calculation unit 62 is set as is as the final target pinion angle $\theta_{p2}*$.

The pinion angle feedback control unit 66 takes in the final target pinion angle $\theta_{p2}*$ calculated by the final target pinion angle calculation unit 65 and the pinion angle $\theta_p$ calculated by the pinion angle calculation unit 61. The pinion angle feedback control unit 66 calculates a turning torque command value $T_p*$ through feedback control of the pinion angle $\theta_p$ such that the pinion angle $\theta_p$ adapts to the final target pinion angle $\theta_{p2}*$. The turning torque command value $T_p*$ is a command value for the torque generated by the turning motor 31, and is a target value of the turning force.

The feedback control is, for example, PID control. The PID control includes proportional control (P-control), integral control (I-control), and derivative control (D-control). The proportional control is a control method that controls the pinion angle $\theta_p$ in proportion to a deviation of the pinion angle $\theta_p$ from the final target pinion angle $\theta_{p2}*$. The integral control is a control method that controls the pinion angle $\theta_p$ in proportion to a time integral of the deviation of the pinion angle $\theta_p$ from the final target pinion angle $\theta_{p2}*$. The derivative control is a control method that controls the pinion angle $\theta_p$ in proportion to a time derivative of the deviation of the pinion angle $\theta_p$ from the final target pinion angle $\theta_{p2}*$. Feedback gains that are control parameters of the feedback control include a proportional gain, an integral gain, and a derivative gain.

The current application control unit 67 supplies electric power according to the turning torque command value $T_p*$ to the turning motor 31. Specifically, the current application control unit 67 calculates a current command value for the turning motor 31 based on the turning torque command value $T_p*$. The current application control unit 67 detects the value of a current $I_b$ that occurs in an electric power supply path to the turning motor 31 through the current sensor 68 provided in the electric power supply path. The value of the current $I_b$ is a value of the current supplied to the turning motor 31. The current application control unit 67 obtains a deviation of the value of the current $I_b$ from the current command value, and controls the electric power supply to the turning motor 31 so as to eliminate this deviation. Specifically, the current application control unit 67 executes feedback control of the current $I_b$ such that the value of the current $I_b$ adapts to the current command value. The feedback control is, for example, PID control. The PID control includes proportional control (P-control), integral control (I-control), and derivative control (D-control). Feedback gains that are control parameters of the feedback control include a proportional gain, an integral gain, and a derivative gain. Through the feedback control of the current $I_b$, the turning motor 31 generates a torque according to the turning torque command value $T_p*$.

The restriction process unit 69 determines whether the turning wheel 6 is hitting an obstacle. The restriction process unit 69 determines that the turning wheel 6 is hitting an obstacle, for example, when the following two Determination Conditions B1 and B2 are both met:

$$|I_b| > I_{th}. \qquad \text{B1}$$

$$T \geq T_{th}. \qquad \text{B2}$$

In Determination Condition B1, "$I_b$" is the value of the current of the turning motor 31, and "$I_{th}$" is a current threshold value. The current threshold value $I_{th}$ is set based on the following perspective: When the turning wheel 6 is hitting an obstacle, it is difficult to perform steering forth. Steering forth is steering the steering wheel 5 so as to turn the turning wheel 6 toward the side of hitting the obstacle. In a situation where the turning wheel 6 is hitting an obstacle, the harder one tries to further turn the turning wheel 6 toward the side of hitting the obstacle, the further the absolute value of the current $I_b$ of the turning motor 31 increases. Thus, it can be said that the larger the absolute value of the current $I_b$ of the turning motor 31 is, the higher the probability is that the turning wheel 6 is hitting an obstacle. Therefore, the value of the current $I_b$ of the turning motor 31 is a value indicating the degree of certainty of a situation where the turning wheel 6 is hitting an obstacle. Based on this perspective, the current threshold value $I_{th}$ is set by an experiment or a simulation.

In Determination Condition B2, "$T$" is a time that has elapsed since the point when Determination Condition B1 was met. "$T_{th}$" is a time threshold value. The time threshold value $T_{th}$ is a time required to confirm the determination result that the turning wheel 6 is hitting an obstacle.

When it is determined that the turning wheel 6 is hitting an obstacle, the restriction process unit 69 executes the current restriction process for the turning motor 31. The current restriction process is a process that restricts the current supplied to the turning motor 31 to restrict an output of the turning motor 31. Specifically, the restriction process unit 69 sets a limit value $I_{lim}$ for restricting the amount of current supplied to the turning motor 31. The limit value $I_{lim}$ is a value of the current that is set based on a perspective of protecting the turning motor 31 from overheating, and is an upper limit value of the amount of current supplied to the turning motor 31. The limit value $I_{lim}$ is, for example, a value smaller than the current threshold value $I_{th}$.

When the limit value $I_{lim}$ is calculated by the restriction process unit 69, the current application control unit 67 restricts the amount of current supplied to the turning motor 31 according to the limit value $I_{lim}$. The current application control unit 67 compares the absolute value of the current intended to be supplied to the turning motor 31 and the limit value $I_{lim}$. When the absolute value of the current intended to be supplied to the turning motor 31 is larger than the limit value $I_{lim}$, the current application control unit 67 restricts the absolute value of the current supplied to the turning motor 31 to the limit value $I_{lim}$. When the absolute value of the current intended to be supplied to the turning motor 31 is equal to or smaller than the limit value $I_{lim}$, the current application control unit 67 supplies the original current that is calculated through the feedback control of the current $I_b$ as is to the turning motor 31.

The restriction process unit 69 sets the value of the current restriction flag $F_{lim}$ according to the determination result that the turning wheel 6 is hitting an obstacle. When it is determined that the turning wheel 6 is not hitting an obstacle, i.e., when at least one of the two Determination Conditions B1 and B2 is not met, the restriction process unit 69 sets the value of the current restriction flag $F_{lim}$ to "off." In reality, "at least one of the two Determination Conditions B1 and B2" means "only Determination Condition B2 or both of the two Determination Conditions B1 and B2." When it is determined that the turning wheel 6 is hitting an obstacle, i.e., when the two Determination Conditions B1 and B2 are both met, the restriction process unit 69 sets the value of the current restriction flag $F_{lim}$ to "on."

The restriction process unit 69 ends the execution of the current restriction process for the turning motor 31 when a specified ending condition is met while the current restriction process for the turning motor 31 is being executed. One example of the ending condition is that steering back of the steering wheel 5 is performed. Steering back is steering the steering wheel 5 so as to turn the turning wheel 6 toward the opposite side from the side of hitting an obstacle. The restriction process unit 69 determines whether steering back has been performed, for example, through a comparison between the steering torque Th detected through the torque sensor 42 and the steering torque threshold value. When the ending condition for the current restriction process is met, the restriction process unit 69 sets the value of the current restriction flag $F_{lim}$ to "off."

Current Restriction Process for Turning Motor 31

Figure 3A:
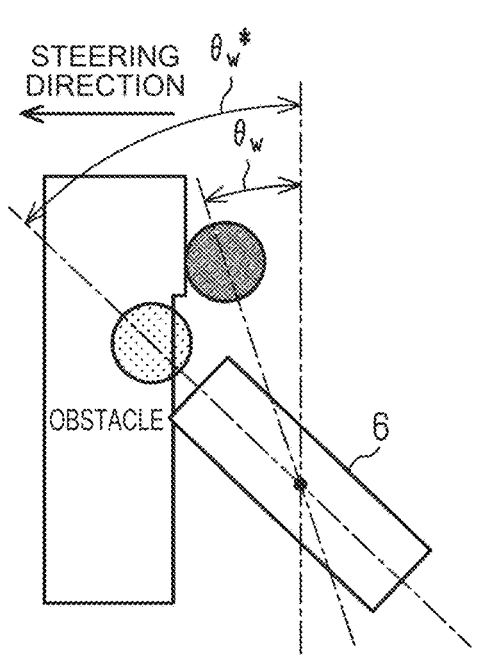
FIG. 3A is a schematic view according to one embodiment, showing a state where a turning wheel is hitting an obstacle.

Next, the current restriction process for the turning motor 31 will be described. As shown in FIG. 3A, when the turning wheel 6 is hitting an obstacle, it is difficult for the turning wheel 6 to turn toward the side of hitting the obstacle. In this state, when steering forth of the steering wheel 5, i.e., steering thereof toward the side of hitting the obstacle is performed, a target turning angle $\theta_w*$ increases as the steering angle $\theta_s$ increases. Meanwhile, the actual turning angle $\theta_w$ is maintained at a constant value. The target turning angle $\theta_w*$ is a target value of the turning angle $\theta_w$ corresponding to the target pinion angle $\theta_{p1}*$. The turning angle $\theta_w$ is the actual turning angle $\theta_w$ corresponding to the pinion angle $\theta_p$. Therefore, in a situation where the turning wheel 6 is hitting an obstacle, the harder one tries to further turn the turning wheel 6, the further the deviation of the actual turning angle $\theta_w$ from the target turning angle $\theta_w*$ increases. In a situation where the turning wheel 6 is hitting an obstacle, when the state where one tries to further turn the turning wheel 6 toward the side of hitting the obstacle continues, the two Determination Conditions B1 and B2 described earlier are both met, so that the current restriction process for the turning motor 31 is executed. Through the execution of the current restriction process, the amount of current supplied to the turning motor 31 is restricted to be equal to or smaller than the limit value $I_{lim}$.

Figure 3B:
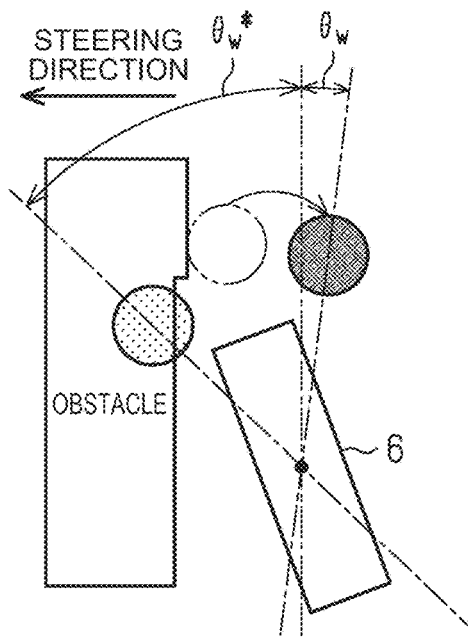
FIG. 3B is a schematic view according to one embodiment, showing a position of the turning wheel when a current restriction process for a turning motor has been executed.

As shown in FIG. 3B, the turning angle $\theta_w$ decreases by an amount corresponding to an amount by which the amount of current supplied to the turning motor 31 becomes smaller than the amount of current according to the present target pinion angle $\theta_{p1}*$. The turning angle $\theta_w$ is the angle of the turning wheel 6 with reference to a turning neutral position corresponding to a state of the vehicle moving straight forward. Therefore, the turning wheel 6 turns toward the opposite side from the obstacle by an amount corresponding to the amount by which the amount of current supplied to the turning motor 31 becomes smaller than the amount of current according to the present target pinion angle $\theta_{p1}*$. The turning wheel 6 is retained, for example, at a position away from the obstacle according to the set limit value $I_{lim}$. However, the steering wheel 5 is still in a state of undergoing steering forth, and the target pinion angle $\theta_{p1}*$ based on the steering angle $\theta_s$ and, by extension, the target turning angle $\theta_w*$ corresponding to the target pinion angle $\theta_{p1}*$ remain the same, for example, before and after the execution of the current restriction process is started.

In FIG. 3A and FIG. 3B, the turning position of the turning wheel 6 corresponding to the target pinion angle $\theta_{p1}*$ and the turning position of the turning wheel 6 corresponding to the actual pinion angle $\theta_p$ are schematically indicated using imaginary circles.

Thereafter, when the ending condition for the current restriction process is met, i.e., steering back of the steering wheel 5 is performed, the execution of the current restriction process for the turning motor 31 ends. Then, an offset process for the target pinion angle $\theta_{p1}*$ is executed. Specifically, the offset angle $\theta_{ofs}$ is calculated by Formula (1) described earlier based on the target pinion angle $\theta_{p1}*$ immediately before the execution of the current restriction process ends and the pinion angle $\theta_p$ immediately before the execution of the current restriction process ends. Next, the final target pinion angle $\theta_{p2}*$ is calculated based on Formula (2) described earlier. Through the execution of this offset process, the final target pinion angle $\theta_{p2}*$ assumes the same value as the present pinion angle $\theta_p$. In other words, the deviation of the pinion angle $\theta_p$ from the final target pinion angle $\theta_{p2}*$ is "0." Therefore, through the feedback control of the pinion angle $\theta_p$, a rapid change in the turning torque command value $T_p*$ and, by extension, the amount of current supplied to the turning motor 31 is made less likely. Thus, a rapid change in the turning angle $\theta_w$ of the turning wheels 6 is made less likely. As a result, generation of abnormal sound accompanying a rapid change in the turning angle $\theta_w$ is made less likely.

The offset angle $\theta_{ofs}$ decreases gradually toward "O" as time passes. Therefore, as time passes, the final target pinion angle $\theta_{p2}*$ gradually approaches the target pinion angle $\theta_{p1}*$ calculated by the target pinion angle calculation unit 62.

Rapid Change in Output of Turning Motor 31

In the steering control device 1 thus configured, there is a concern as follows. As shown in the upper figure of FIG. 4, for example, when the absolute value of the target pinion angle $\theta_{p1}*$ increases as the steering wheel 5 is steered, the absolute value of the pinion angle $\theta_p$ increases so as to adapt to the target pinion angle $\theta_{p1}*$ as a result of the feedback control of the pinion angle $\theta_p$.

Figure 4:
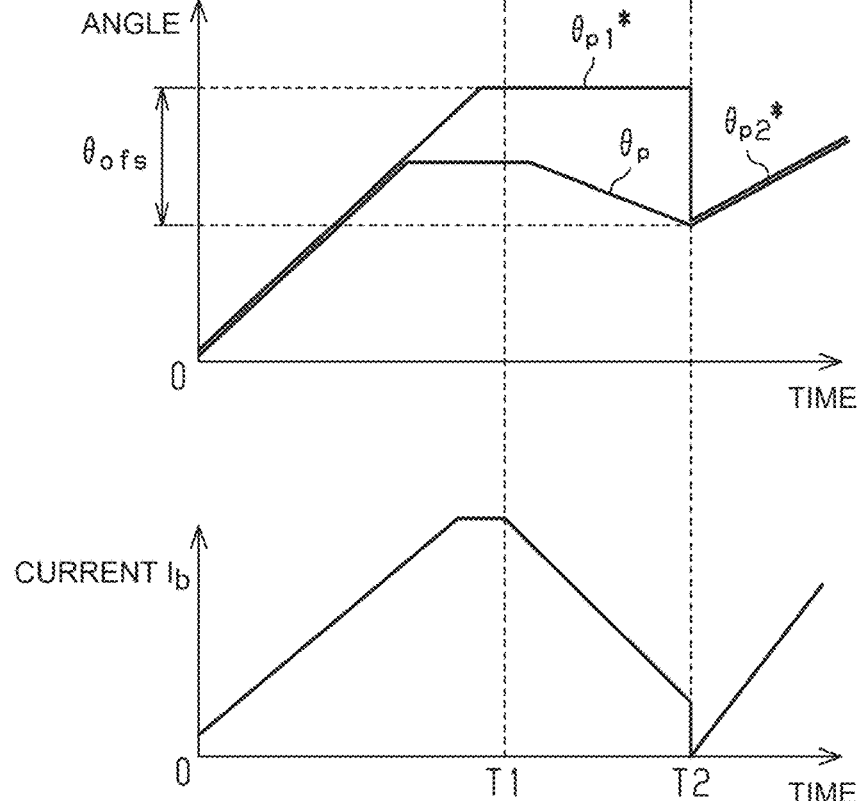
FIG. 4 is a graph according to a comparative example, showing changes over time in a target pinion angle and a pinion angle, and is a graph according to the comparative example, showing changes over time in a current supplied to a turning motor.

As shown in the lower figure of FIG. 4, the absolute value of the current $I_b$ supplied to the turning motor 31 increases as the absolute value of the pinion angle $\theta_p$ increases. However, after the execution of the current restriction process for the turning motor 31 is started (time T1), the absolute value of the current $I_b$ supplied to the turning motor 31 decreases gradually toward the limit value $I_{lim}$.

As shown in the upper figure of FIG. 4, as the absolute value of the current $I_b$ supplied to the turning motor 31 decreases, the absolute value of the pinion angle $\theta_p$ decreases gradually. Thereafter, when the execution of the current restriction process for the turning motor 31 ends (time T2), the execution of the offset process for the target pinion angle $\theta_{p1}*$ is started. Specifically, the offset angle $\theta_{ofs}$ is calculated based on Formula (1) described earlier, and the final target pinion angle $\theta_{p2}*$ is calculated based on Formula (2) described earlier. The offset angle $\theta_{ofs}$ is calculated such that the final target pinion angle $\theta_{p2}*$ matches the pinion angle $\theta_p$. Thus, the deviation of the pinion angle $\theta_p$ from the final target pinion angle $\theta_{p2}*$ becomes "0."

As shown in the lower figure of FIG. 4, as a result of the execution of the offset process, the deviation of the pinion angle $\theta_p$ from the final target pinion angle $\theta_{p2}*$ becomes "0," so that the absolute value of the current $I_b$ supplied to the turning motor 31 decreases rapidly toward "0" and instantly reaches "0." Thus, the output of the turning motor 31 and, by extension, the turning angle $\theta_w$ of the turning wheels 6 may change rapidly.

Calculation Method of Offset Angle $\theta_{ofs}$

In this embodiment, to make the rapid change in the turning angle $\theta_w$ due to the execution of the offset process less likely, the offset angle calculation unit 64 calculates the offset angle $\theta_{ofs}$ as follows. Specifically, the offset angle calculation unit 64 calculates the offset angle $\theta_{ofs}$ using the following Formula (3):

$$\theta_{ofs} = \theta_{p1}* - \theta_p - \Delta\theta_p^\wedge \tag{3}$$

Here, "$\theta_{p1}*$" is the target pinion angle at the time when the execution of the current restriction process ends, i.e., the present target pinion angle. "$\theta_p$" is the pinion angle at the time when the execution of the current restriction process ends, i.e., the present pinion angle. "$\Delta\theta_p^\wedge$" is an estimated pinion angle deviation.

The estimated pinion angle deviation $\Delta\theta_p^\wedge$ is a difference between the target pinion angle $\theta_{p1}*$ and the pinion angle $\theta_p$ that is the real angle with reference to the current $I_b$ that is flowing through the turning motor 31 at present. The estimated pinion angle deviation $\Delta\theta_p^\wedge$ is expressed by the following Formula (4). In Formula (4), "/" represents division and "." represents multiplication.

$$\Delta\theta_p^\wedge = I_b/\{G_p \cdot I_t/T_p\} \tag{4}$$

Here, "$I_b$" is the last value of the current supplied to the turning motor 31, i.e., the value of the current of the turning motor 31 immediately before the execution of the current restriction process ends. The unit of the current $I_b$ is "A (ampere)." "$G_p$" is the proportional gain of the pinion angle feedback control unit 66. The unit of the proportional gain $G_p$ is "Nm/deg (newton meter per degree)." "$I_t$" is a rated current of the turning motor 31. The unit of the rated current $I_t$ is "A (ampere)." The rated current $I_t$ is stored in the memory. "$T_p$" is a rated pinion torque. The unit of the rated pinion torque $T_p$ is "Nm (newton meter)." The rated pinion torque $T_p$ is stored in the memory.

By using Formula (4), the offset angle calculation unit 64 can calculate the estimated rotation angle deviation $\Delta\theta_p\hat{}$ of the pinion angle $\theta_p$ as an angle corresponding to correction by the proportional control from the last time to the present time.

Workings of Embodiment

Thus, the following workings can be produced. As shown in the upper figure of FIG. 5, for example, when the absolute value of the target pinion angle $\theta_{p1}{}^*$ increases as the steering wheel 5 is steered, the absolute value of the pinion angle $\theta_p$ increases so as to adapt to the target pinion angle $\theta_{p1}{}^*$ as a result of the feedback control of the pinion angle $\theta_p$.

Figure 5:
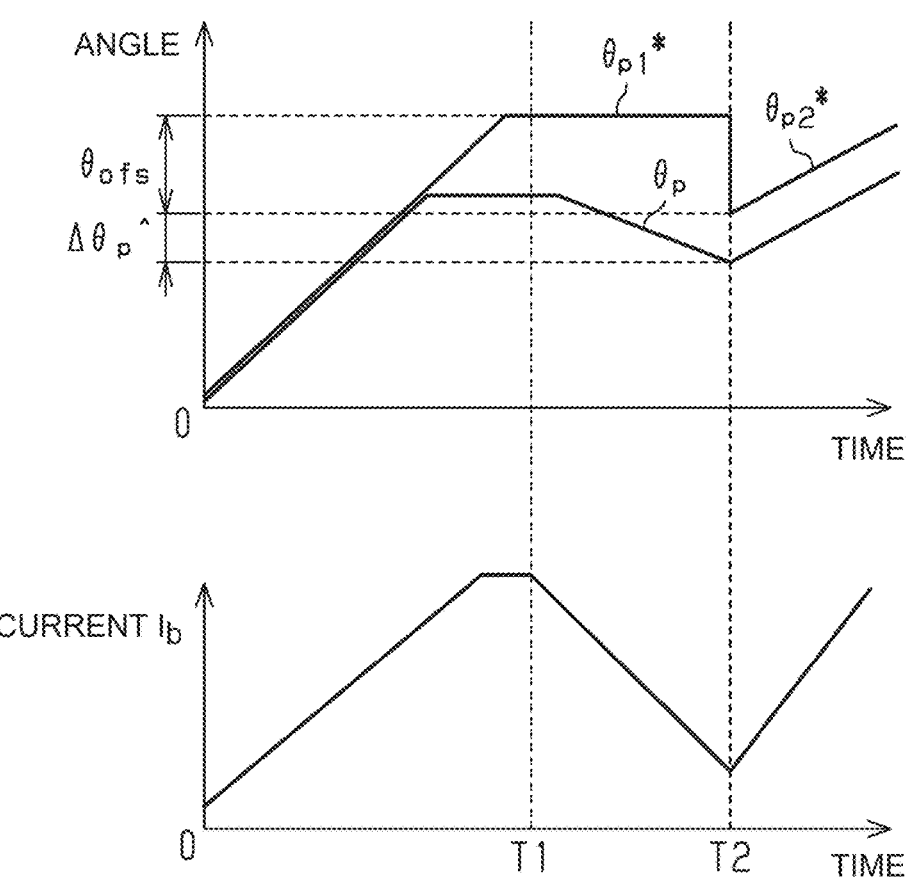
FIG. 5 is a graph according to one embodiment, showing changes over time in the target pinion angle and the pinion angle, and is a graph according to one embodiment, showing changes over time in the current supplied to the turning motor.

As shown in the lower figure of FIG. 5, the absolute value of the current $I_b$ supplied to the turning motor 31 increases as the absolute value of the pinion angle $\theta_p$ increases. However, after the execution of the current restriction process for the turning motor 31 is started (time T1), the absolute value of the current $I_b$ supplied to the turning motor 31 decreases gradually toward the limit value $I_{lim}$.

As shown in the upper figure of FIG. 5, as the absolute value of the current $I_b$ supplied to the turning motor 31 decreases, the absolute value of the pinion angle $\theta_p$ decreases gradually. Thereafter, when the execution of the current restriction process for the turning motor 31 ends (time T2), the execution of the offset process for the target pinion angle $\theta_{p1}{}^*$ is started. Specifically, the offset angle $\theta_{ofs}$ is calculated based on Formulae (3) and (4) described earlier, and the final target pinion angle $\theta_{p2}{}^*$ is calculated based on Formula (2) described earlier. However, unlike the comparative example shown in the upper figure of FIG. 4 and the lower figure of FIG. 4 described earlier, the deviation of the pinion angle $\theta_p$ from the final target pinion angle $\theta_{p2}{}^*$ does not become "0." The absolute value of the deviation of the pinion angle $\theta_p$ from the final target pinion angle $\theta_{p2}{}^*$ is equal to the absolute value of the estimated pinion angle deviation $\Delta\theta_p\hat{}$.

As shown in the lower figure of FIG. 5, even when the execution of the offset process is started, the deviation of the pinion angle $\theta_p$ from the final target pinion angle $\theta_{p2}{}^*$ does not become "0." Therefore, while the absolute value of the current $I_b$ supplied to the turning motor 31 decreases rapidly, it does not instantly reach "0." The absolute value of the current $I_t$ becomes equal to the last absolute value of the current $I_b$, i.e., the absolute value of the current $I_b$ immediately before the execution of the current restriction process ends. Thus, compared with the comparative example shown in the upper figure of FIG. 4 and the lower figure of FIG. 4 described earlier, a rapid change in the output of the turning motor 31 and, by extension, a rapid change in the turning angle $\theta_w$ of the turning wheels 6 are made less likely.

Advantages of Embodiment

This embodiment offers the following advantages. The steering control device 1 has the target pinion angle calculation unit 62, the offset angle calculation unit 64, the final target pinion angle calculation unit 65, and the pinion angle feedback control unit 66. The target pinion angle calculation unit 62 calculates the target pinion angle $\theta_{p1}{}^*$ that is the target rotation angle of the pinion shaft 21 based on the steering angle $\theta_s$ of the steering wheel 5. When a specified event occurs, the offset angle calculation unit 64 calculates the offset angle $\theta_{ofs}$ relative to the target pinion angle $\theta_{p1}{}^*$. The final target pinion angle calculation unit 65 calculates the final target pinion angle $\theta_{p2}{}^*$ that is the target rotation angle as final of the pinion shaft 21 by subtracting the offset angle $\theta_{ofs}$ from the target pinion angle $\theta_{p1}{}^*$.

The pinion angle feedback control unit 66 executes the feedback control that makes the pinion angle $\theta_p$ that is the real angle of the pinion shaft 21 adapt to the final target pinion angle $\theta_{p2}{}^*$. The offset angle calculation unit 64 calculates the estimated pinion angle deviation $\Delta\theta_p\hat{}$ based on the value of the current $I_b$ of the turning motor 31 immediately before the event occurs. The estimated pinion angle deviation $\Delta\theta_p\hat{}$ is the difference between the target pinion angle $\theta_{p1}{}^*$ and the pinion angle $\theta_p$ with reference to the current $I_b$ that is flowing through the turning motor 31 at present. The offset angle calculation unit 64 calculates the offset angle $\theta_{ofs}$ by subtracting the pinion angle $\theta_p$ and the estimated pinion angle deviation $\Delta\theta_p\hat{}$ from the target pinion angle $\theta_{p1}{}^*$.

According to this configuration, when the specific event occurs in a state where there is a discrepancy between the target pinion angle $\theta_{p1}{}^*$ and the pinion angle $\theta_p$, the final target pinion angle $\theta_{p2}{}^*$ does not match the present value of the pinion angle $\theta_p$. Therefore, while the absolute value of the current $I_b$ supplied to the turning motor 31 decreases rapidly, the absolute value of the current Is supplied to the turning motor 31 does not instantly reach "0." Thus, a rapid change in the output of the turning motor 31 and, by extension, a rapid change in the turning angle $\theta_w$ of the turning wheels 6 due to the absolute value of the current $I_b$ supplied to the turning motor 31 instantly reaching "0" can be made less likely.

The target pinion angle calculation unit 62 corresponds to the target rotation angle calculation unit. The final target pinion angle calculation unit 65 corresponds to the final target rotation angle calculation unit. The pinion angle feedback control unit 66 corresponds to the feedback control unit.

The offset angle calculation unit 64 gradually reduces the offset angle $\theta_{ofs}$ toward "0" after calculating the offset angle $\theta_{ofs}$. According to this configuration, the pinion angle $\theta_p$ that is the real angle of the pinion shaft 21 can be adapted to the final target pinion angle $\theta_{p2}{}^*$ while a rapid change in the output of the turning motor 31 is made less likely.

The pinion angle feedback control unit 66 executes the proportional control that controls the pinion angle $\theta_p$ in proportion to the deviation of the pinion angle $\theta_p$ from the final target pinion angle $\theta_{p2}{}^*$. The offset angle calculation unit 64 calculates the estimated pinion angle deviation $\Delta\theta_p\hat{}$ based on Formula (4) described earlier. According to this configuration, the estimated pinion angle deviation $\Delta\theta_p\hat{}$ of the pinion shaft 21 can be calculated as an angle corresponding to correction by the proportional control from the last time to the present time.

The specific event is that the current restriction process in which the current $I_b$ supplied to the turning motor 31 is restricted is ended. When the current restriction process for the turning motor 31 is executed as in this configuration, a discrepancy occurs between the target pinion angle $\theta_{p1}{}^*$ and the pinion angle $\theta_p$. Therefore, when the execution of the current restriction process is ended, a rapid change in the output of the turning motor 31 can be made less likely through the execution of the offset process based on Formulae (3) and (4) described earlier.

The steering device 2 is a steer-by-wire steering device in which power transmission between the steering wheel 5 and the turning wheels 6 is cut off. The steering control device 1 of this embodiment is suitable for the steer-by-wire steering device 2.

OTHER EMBODIMENTS

This embodiment may be implemented with the following changes made thereto. The offset process may be executed not only at the timing when the current restriction for the turning motor 31 is canceled but also at the time when the vehicle system is started, i.e., at the time when the vehicle power source is turned on.

Figure 6A:
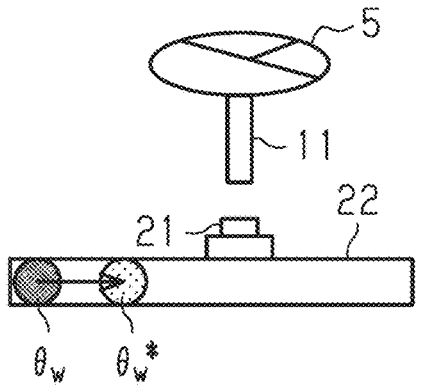
FIG. 6A is a schematic view according to another embodiment, showing a state where there is a discrepancy between a target turning angle and an actual turning angle.

As shown in FIG. 6A, it is conceivable that there is a difference between the target turning angle $\theta_w^*$ and the actual turning angle $\theta_w$ at the time when the vehicle power source is turned on. In this case, there is also a difference between the target pinion angle $\theta_{p1}^*$ based on the steering angle $\theta_s$ and the actual pinion angle $\theta_p$. Therefore, the turning angle $\theta_w$ may change rapidly through the execution of the feedback control of the pinion angle $\theta_p$.

Figure 6B:
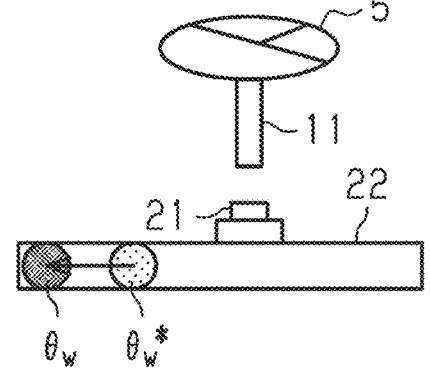
FIG. 6B is a schematic view according to that other embodiment, showing a process of matching the target turning angle with the actual turning angle.

As shown in FIG. 6B, to make such a rapid change in the turning angle $\theta w$ less likely at the time when the vehicle power source is turned on, it is conceivable, for example, to execute an offset process based on Formulae (1) and (2) described earlier at the time when the vehicle power source is turned on. Specifically, the target pinion angle $\theta_{p1}^*$ is offset such that the target pinion angle $\theta_{p1}^*$ matches the actual pinion angle $\theta_p$. Matching the target pinion angle $\theta_{p1}^*$ with the actual pinion angle $\theta_p$ is synonymous with matching the target turning angle $\theta w^*$ with the actual turning angle $\theta_w$. The target pinion angle $\theta_{p1}^*$ after the offset is the final target pinion angle $\theta_{p2}^*$.

In this case, however, as the deviation of the pinion angle $\theta_p$ from the final target pinion angle $\theta_{p2}^*$ becomes "0," the absolute value of the current $I_b$ supplied to the turning motor 31 decreases rapidly toward "0" and instantly reaches "0." Thus, the output of the turning motor 31 and, by extension, the turning angle $\theta_w$ of the turning wheels 6 may change rapidly.

To make the rapid change in the turning angle $\theta_w$ due to the execution of the offset process less likely, the offset angle $\theta_{ofs}$ is calculated using Formula (3) described earlier. Thus, even when the execution of the offset process is started, the deviation of the pinion angle $\theta_p$ from the target pinion angle $\theta_{p1}^*$ does not become "0." Therefore, while the absolute value of the current $I_b$ supplied to the turning motor 31 decreases rapidly, it does not instantly reach "0." Thus, even when there is a discrepancy between the target pinion angle $\theta_{p1}^*$ and the pinion angle $\theta_p$ that is the real angle when the vehicle power source is turned on, a rapid change in the output of the turning motor 31 and, by extension, a rapid change in the turning angle $\theta_w$ of the turning wheels 6 can be made less likely. That the power source of the vehicle is turned on corresponds to the specific event.

The steering device 2 may be an electric power steering device having a variable-gear-ratio (VGR) function. In the electric power steering device, the steering wheel 5 and the turning wheels 6 are coupled to each other so as to be able to transmit power. Specifically, the steering shaft 11 and the pinion shaft 21 are coupled to each other so as to be integrally rotatable. Some electric power steering devices have the VGR function. The VGR function is a function of changing a steering gear ratio that is the ratio of the turning angle $\theta_w$ of the turning wheels 6 to the steering angle $\theta_s$ of the steering wheel 5, for example, for the purpose of improving steerability. The electric power steering device having the VGR function has a VGR motor that is provided on the steering shaft 11. The steering gear ratio is changed through driving of the VGR motor. The steering control device 1 of this embodiment is suitable for an electric power steering device having the VGR function.

What is claimed is:

1. A steering control device configured to control electric power supply to a turning motor that drives a steering device that turns a turning wheel of a vehicle, the steering control device comprising:

a target rotation angle calculation circuit configured to calculate, according to a steering angle of a steering wheel, a target rotation angle of a shaft that rotates in conjunction with a turning action of the turning wheel;

an offset angle calculation circuit configured to calculate an offset angle relative to the target rotation angle when a specific event occurs in a state where there is a discrepancy between the target rotation angle and a real angle of the shaft;

a final target rotation angle calculation circuit configured to calculate a final target rotation angle of the shaft by subtracting the offset angle from the target rotation angle; and a feedback control circuit configured to execute feedback control that adapts the real angle to the final target rotation angle; wherein the offset angle calculation circuit is configured to calculate an estimated rotation angle deviation based on a value of a current of the turning motor immediately before the specific event occurs, and is configured to calculate the offset angle by subtracting the real angle and the estimated rotation angle deviation from the target rotation angle.

2. The steering control device according to claim 1, wherein the offset angle calculation circuit is configured to gradually reduce the offset angle toward zero after calculating the offset angle.

3. The steering control device according to claim 1, wherein:

the feedback control circuit is configured to execute proportional control that controls the real angle in proportion to a deviation of the real angle from the final target rotation angle; and when the estimated rotation angle deviation is "$\Delta\theta_p^{\wedge}$," the value of the current of the turning motor immediately before the specific event occurs is "$I_b$," a proportional gain of the feedback control circuit is "$G_p$," a rated current of the turning motor is "$I_r$," and a rated pinion torque is "$T_p$," the offset angle calculation circuit is configured to calculate the estimated rotation angle deviation based on the following Formula (A):

$$\Delta\theta_p^{\wedge} = I_b / \{G_p \cdot I_r / T_p\} \tag{A}$$

4. The steering control device according to claim 1, wherein the specific event is that execution of a current restriction process in which a current supplied to the turning motor is restricted is ended.

5. The steering control device according to claim 1, wherein the specific event is that a power source of the vehicle is turned on.

6. The steering control device according to claim 1, wherein the steering device is a steer-by-wire steering device in which power transmission between the steering wheel and the turning wheel is cut off.

7. The steering control device according to claim 1, wherein the steering device is an electric power steering device in which the steering wheel and the turning wheel are coupled to each other so as to transmit power, and the electric power steering device has a variable-gear-ratio function of changing a steering gear ratio that is a ratio of a turning angle of the turning wheel to the steering angle of the steering wheel.

* * * * *